(12) United States Patent
Wilson et al.

(10) Patent No.: US 10,889,378 B1
(45) Date of Patent: Jan. 12, 2021

(54) SYSTEM FOR HEATING AND COOLING A SEAT AND SEAT ASSEMBLIES

(71) Applicant: B/E Aerospace, Inc., Winston-Salem, NC (US)

(72) Inventors: Christopher Wilson, Clemmons, NC (US); Peter A. Stahl, Winston-Salem, NC (US); Daniel I. Udriste, Winston-Salem, NC (US); Catalin Bunea, Miramar, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/549,006

(22) Filed: Aug. 23, 2019

(51) Int. Cl.
| | |
|---|---|
| A47C 7/40 | (2006.01) |
| B64D 13/00 | (2006.01) |
| B64D 11/06 | (2006.01) |
| B60N 2/56 | (2006.01) |

(52) U.S. Cl.
CPC ........ B64D 11/0626 (2014.12); B60N 2/5657 (2013.01)

(58) Field of Classification Search
CPC ...... A47C 7/74; B60N 2/5657; B60N 2/5642; B64D 11/0626; B64D 2/5657
See application file for complete search history.

(56) References Cited

U.S. PATENT DOCUMENTS

| | | | | |
|---|---|---|---|---|
| 3,529,310 | A * | 9/1970 | Olmo Giuseppe | A47C 27/04 5/423 |
| 4,031,579 | A | 6/1977 | Larned | |
| 5,002,336 | A * | 3/1991 | Feher | A47C 7/744 297/180.13 |
| 5,926,884 | A * | 7/1999 | Biggie | A61G 7/05776 297/180.13 |
| 6,088,642 | A * | 7/2000 | Finkelstein | B60N 2/002 701/49 |
| 6,505,886 | B2 * | 1/2003 | Gielda | A47C 7/74 297/180.1 |
| 6,869,140 | B2 | 3/2005 | White et al. | |
| 2002/0145312 | A1 * | 10/2002 | Gielda | B60N 2/5657 297/180.13 |
| 2004/0160092 | A1 | 8/2004 | Laib | |
| 2013/0040546 | A1 * | 2/2013 | Noske | B64D 13/06 454/76 |
| 2017/0080837 | A1 * | 3/2017 | Cho | B60N 2/5657 |
| 2018/0311089 | A1 * | 11/2018 | Sachdev | A61G 7/05776 |
| 2019/0061573 | A1 * | 2/2019 | Dry | B60N 2/5635 |
| 2019/0061577 | A1 * | 2/2019 | Dry | B60N 2/5635 |

* cited by examiner

Primary Examiner — Shin H Kim
(74) Attorney, Agent, or Firm — Suiter Swantz pc llo

(57) ABSTRACT

A system for heating and cooling a passenger seat utilizing a single unit for producing hot and cold conditioned air. The system includes a source of pressurized air, a vortex tube coupled to the source of pressurized air for producing hot and cold air streams, a duct network coupled to the vortex tube through a valve assembly, and a controller controlling passage of the flow of hot and cold air streams through the manifold assembly based on passenger selection. Conditioned air flow can be dispersed into a cushion assembly such as an interior of a spacer mesh component of the cushion assembly.

20 Claims, 4 Drawing Sheets

SYSTEM FOR HEATING AND COOLING A SEAT AND SEAT ASSEMBLIES

BACKGROUND

Seats such as aircraft passenger seats can be conditioned with heated or cooled air to enhance comfort. Seat heating systems typically utilize an embedded heating element electrically activated to raise the surface temperature of seat elements in direct contact with the seat occupant. Seat cooling systems typically utilize an embedded air circulation system for distributing cooled conditioned air through a perforated dress cover. While heating systems require separate heating elements for each individual seat, multiple cooling systems can draw conditioned air from a single source such as a vehicle air conditioning system. No current systems utilize a single unit both heat or cool a seat.

Accordingly, what is needed is a system capable of heating and cooling a seat with a single unit that is simple, robust and economical for broad application in passenger vehicles such as aircraft. Such a system would provide a competitive advantage over carriers with seats lacking a seat conditioning system, among other advantages.

SUMMARY OF THE INVENTIVE ASPECTS

To achieve the foregoing and other aspects, embodiments of the inventive concepts disclosed herein are directed to a seat heating and cooling system including a source of pressurized air, a vortex tube having an air inlet coupled to the source of pressurized air, a hot air outlet disposed at a first end of the vortex tube, and a cold air outlet disposed at a second end of the vortex tube, a manifold assembly having a hot air inlet coupled to the hot air outlet, a cold air inlet coupled to the cold air outlet, and an air return coupled to the source of pressurized air or a vehicle HVAC system, a network of ducts coupled to the manifold assembly and embedded in a cushion assembly for dispersing conditioned air into the cushion assembly, and a controller for controlling passage of hot and cold air through the manifold assembly.

In some embodiments, the cushion assembly includes embedded spacer mesh and a perforated dress cover, wherein the network of ducts includes ducts positioned to disperse conditioned air into an interior of the spacer mesh to be dispersed through the perforated dress cover.

In some embodiments, the cushion assembly is disposed in a backrest, the spacer mesh is disposed in an upper portion and a lower portion of the backrest, and the network of ducts includes at least one duct extending between the manifold assembly and the upper portion of the backrest and at least one duct extending between the manifold assembly and the lower portion of the backrest.

In some embodiments, the cushion assembly is disposed in a seat bottom, the spacer mesh is disposed in an upper portion of the seat bottom, and the duct network includes at least one duct extending between the manifold assembly and the upper portion of the seat bottom.

In some embodiments, the system includes a first cushion assembly disposed in a backrest having spacer mesh disposed in an upper portion and a lower portion of the backrest, and a second cushion assembly disposed in a seat bottom having spacer mesh disposed in an upper portion of the seat bottom, wherein the duct network includes at least one duct extending between the manifold assembly and the upper portion of the backrest, at least one duct extending between the manifold assembly and the lower portion of the backrest, and at least one duct extending between the manifold assembly and the upper portion of the seat bottom.

In some embodiments, the manifold assembly operates to provide one of hot air and cold air to the network of ducts while returning the other of hot air and cold air to the source of pressurized air.

In some embodiments, the manifold assembly operates to mix hot and cold air supplied from the vortex tube.

In some embodiments, the source of pressurized air is a dedicated air compressor or air from a vehicle air system.

In some embodiments, the controller is disposed in a seat element or proximate a seat.

In some embodiments, the vortex tube includes an elongate acceleration chamber in fluid communication with the air inlet, the hot air outlet, and the cold air outlet, and wherein pressurized air enters through the air inlet tangentially to one side of the tube and into the acceleration chamber.

In another aspect, the inventive concepts disclosed herein are directed to a passenger seat including a frame, a cushion assembly supported on the frame and including spacer mesh, a vortex tube having an air inlet adapted to be coupled to a source of pressurized air, a hot air outlet disposed at a first end of the vortex tube, and a cold air outlet disposed at a second end of the vortex tube, a manifold assembly having a hot air inlet coupled to the hot air outlet, a cold air inlet coupled to the cold air outlet, and an air return adapted to be coupled to the source of pressurized air, a network of ducts coupled to the manifold assembly and embedded in the seat cushion assembly for dispersing conditioned air into the spacer mesh, and a controller for controlling passage of hot and cold air through the manifold assembly, the controller disposed within a seat element or proximate the passenger seat.

In another aspect, the inventive concepts disclosed herein are directed to an economy class aircraft passenger seat assembly including a cushion assembly including a spacer mesh component, a vortex tube having an air inlet adapted to be coupled to a source of pressurized air, a hot air outlet disposed at a first end of the vortex tube, and a cold air outlet disposed at a second end of the vortex tube, a manifold assembly having a hot air inlet coupled to the hot air outlet, a cold air inlet coupled to the cold air outlet, and an air return adapted to be coupled to the source of pressurized air, a network of ducts coupled to the manifold assembly and embedded in the seat cushion assembly for dispersing conditioned air into the spacer mesh, and a controller for controlling passage of hot and cold air through the manifold assembly, the controller operatively coupled to or an integral part of a passenger seat control interface for at least one of activating the controller, selecting between heated or cooled conditioned air, and selecting a conditioned air temperature.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

The inventive concepts disclosed herein are directed to passenger seat constructions and systems for conditioning passenger seats utilizing a single unit for providing both hot and cold conditioning air. The systems disclosed herein are suitable for use in a variety of seat constructions and therefore find widespread application in passenger vehicles such as aircraft, for example, in premium and economy class aircraft passenger seats, among crew seats and others. The systems and components disclosed herein can be integrated into seat constructions mutually exclusive of adjustment and other capabilities of the seat. The systems according to the present disclosure can be used to condition seat elements as well as other furniture, vehicle environments, etc.

Figure 1:
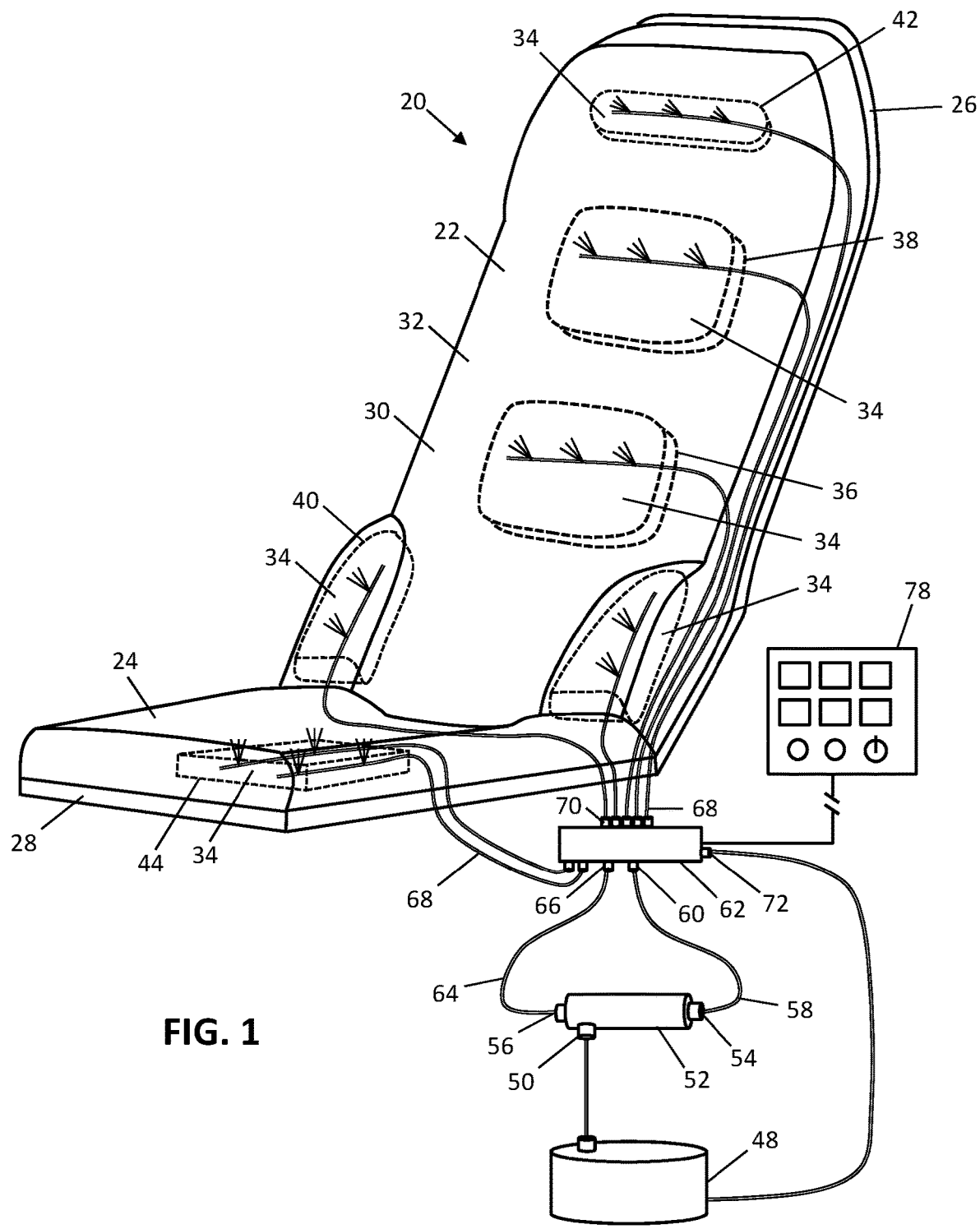
FIG. 1 illustrates a passenger seat construction and system for seat heating and cooling the seat according to the present disclosure.
Figure 2:
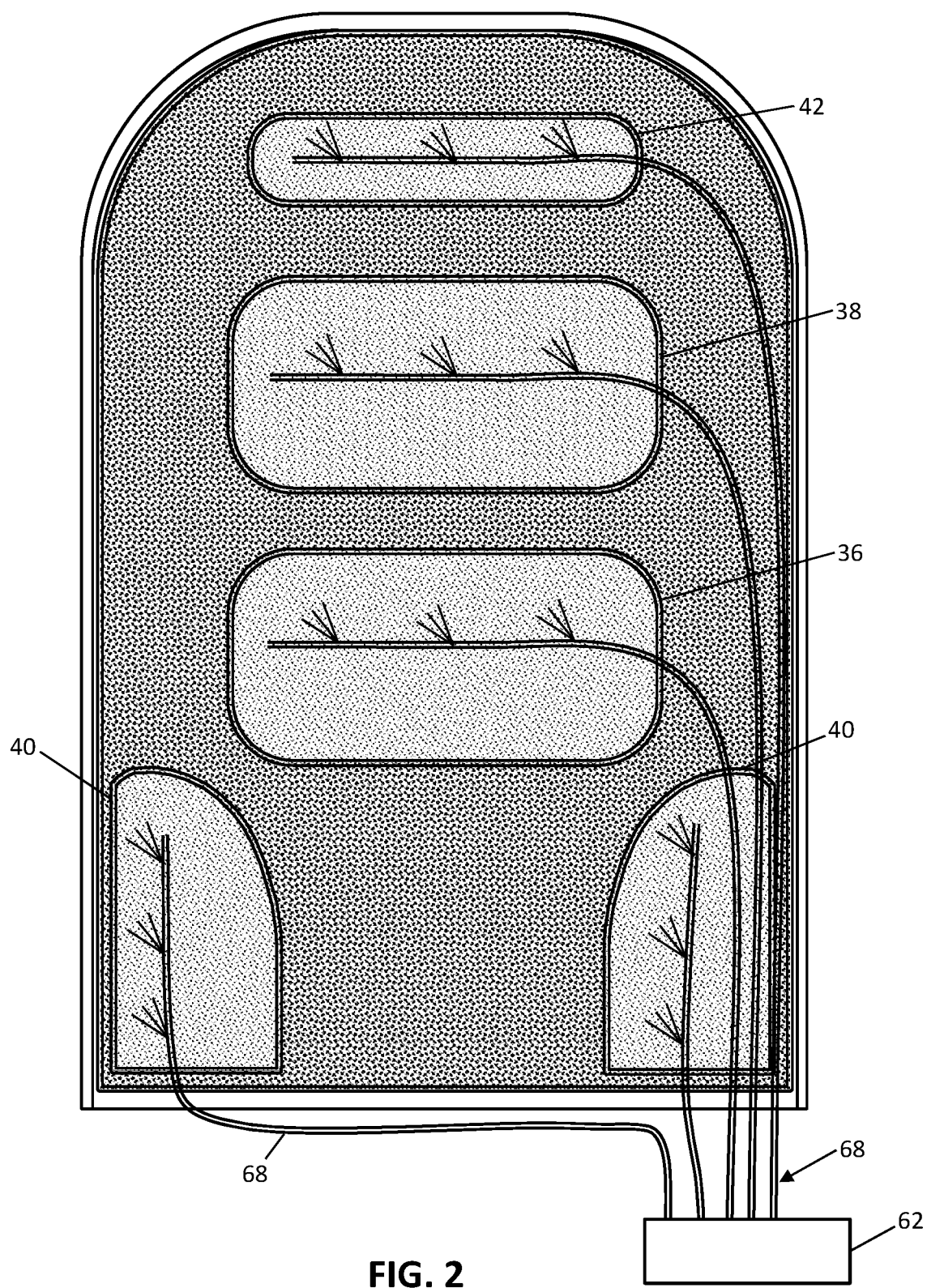
FIG. 2 illustrates a backrest cushion assembly according to the present disclosure.
Figure 3:
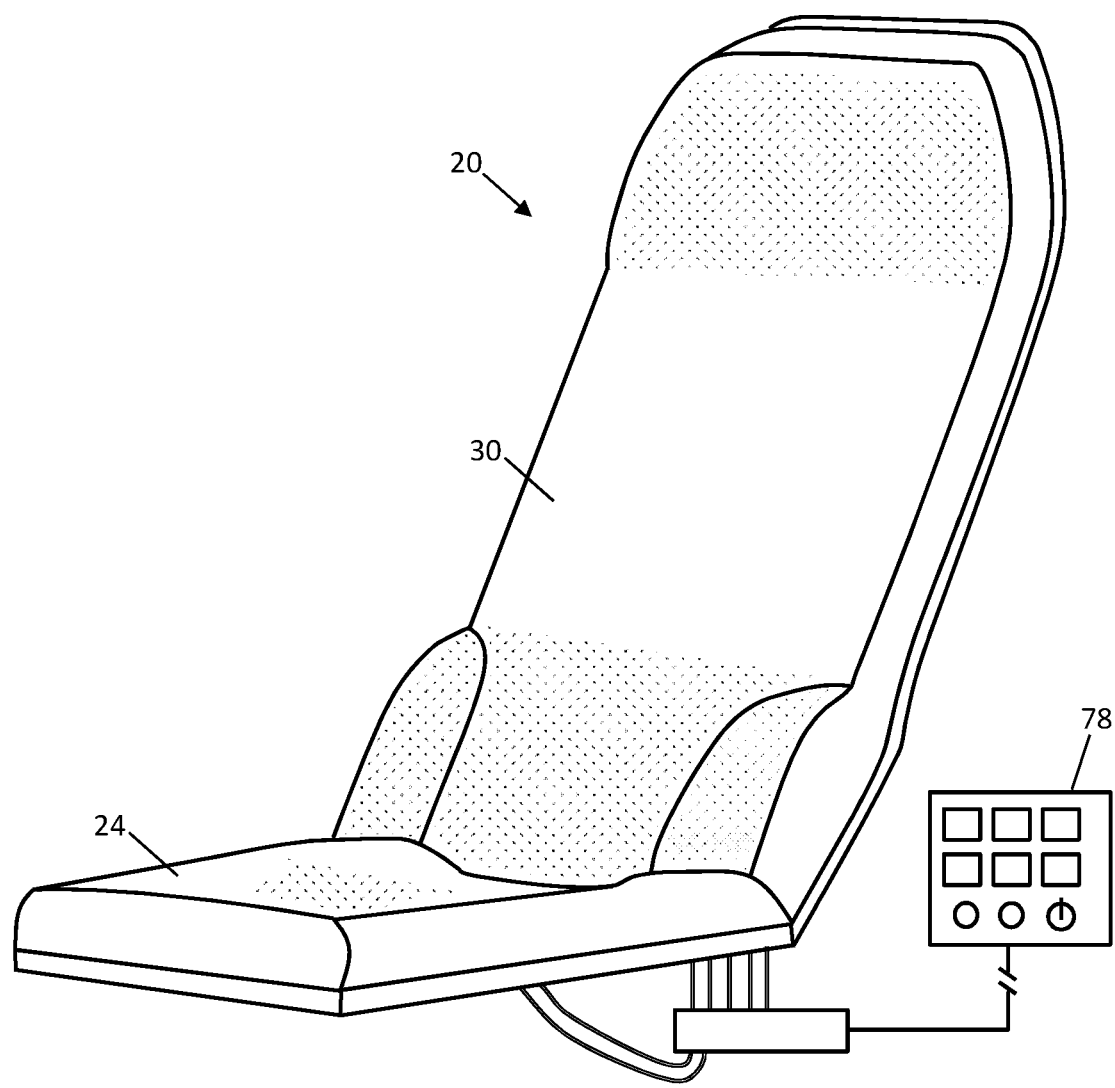
FIG. 3 illustrates spacer mesh positioning within a passenger seat assembly according to the present disclosure.

Referring to FIGS. 1-3, a non-limiting example of a seat assembly is shown at reference numeral 20. The seat assembly 20 generally includes a backrest cushion assembly 22 and a seat bottom cushion assembly 24. A backrest structural element 26 supports the backrest cushion assembly 22. A seat pan 28 supports the seat bottom cushion assembly 24. Each of the backrest structural element 26 and the seat pan 28 may be constructed from rigid materials such as composites to support their respective flexible cushion assembly. Each of the backrest cushion assembly 22 and the seat bottom cushion assembly 26 can be covered with a dress cover 30 for comfort, performance and aesthetics. Portions of the dress cover 30 can be perforated to release conditioned air from within the cushion assembly through the porous surface. As shown in FIG. 3, perforated portions may correspond to predetermined target regions or areas, for example, perforations may be provided in one or more of upper and lower portions of the front face of the backrest 30 dress cover and a top portion of the seat bottom 24 dress cover.

The construction and configuration of the backrest structural element 26 and the seat pan 28 may vary. For example, the two components may be continuous across the respective back and bottom of the seat or may be skeletal elements supporting a diaphragm. The two components may be pivotally coupled such that the backrest can pivot to relative to the seat bottom to recline the seat. The components may be pivotally coupled to each other or to other frame elements such as seat spreaders. The inclination of the backrest may be adjusted and locked relative to the seat bottom. In an economy class seat construction, for example, a gas compression spring may act between the backrest and the frame with a release positioned in the armrest actuated to unlock the gas spring through a lever and Bowden cable arrangement, among other arrangements. In a premium class seat construction, a control panel may be electrically coupled to one or seat actuators dedicated for driving component adjustability either alone or together to achieve predetermined sitting positions. The systems disclosed herein may operate together with or mutually exclusive of seat adjustment systems.

Each of the backrest cushion assembly 22 and the seat bottom cushion assembly 24 can be constructed with a combination of materials. In some embodiments, the cushion assemblies include one or more layers of open-cell foam and closed-cell flotation foam with optional fire-resistant layers or additives, referred to herein collectively as the "foam" portion of the cushion assembly shown generally at reference numeral 32. Cushion assemblies can additionally include spacer mesh 34 positioned in predetermined areas of the cushion assembly. In some embodiments, spacer mesh may be a three-dimensional mesh like body attached to or embedded within the foam to prevent the spacer mesh from being displaced with respect to the foam body. In some embodiments, the spacer mesh is positioned in ventilated regions of the cushion assembly and the foam is positioned outside of ventilated regions of the cushion assembly. While both the foam and the spacer mesh provide comfort and passenger support, the open-cell structure of the spacer mesh allows better air flow and dispersion therethrough. Some spacer mesh within the cushion assembly may be positioned near a front of the cushion assembly to direct air flow out through the perforated dress cover and across the passenger. Other spacer mesh may be positioned internal to the seat cushion assembly.

Ventilated regions may correspond to surfaces of likely passenger contact. Regarding the backrest cushion assembly 22, spacer mesh may be provided in at least one of a lower backrest or lumbar region 36, an upper backrest region 38, side bolster regions 40, and a headrest region 42. Regarding the seat bottom cushion assembly 24, spacer mesh may be positioned in a top surface of a central region 44 of the seat bottom. While the positioning of the spacer mesh may correspond to regions of the cushion assembly likely to be in passenger contact in different sitting positions, the spacer mesh may also be positioned to one or more the lateral sides and longitudinal ends in embodiments functioning to move air through the cushion assembly in general.

The properties of the foam (e.g., polyurethane foam, soft synthetic resin foam, etc.) may provide better comfort performance as compared to the spacer mesh, while the open-cell structure of the spacer mesh may provide better air flow performance as compared to the foam. Depending on the types of foam and spacer mesh, comfort differences between the two foam types may be imperceptible to the passenger, particularly when positioned beneath a seat dress cover. Each of the foam and the spacer mesh may be formed with contouring and concave portions to conform to passenger anatomy. Portions of the spacer mesh adjacent the foam may be sealed to prevent air leakage. In some embodiments, the face(s) of the spacer mesh facing away from the passenger may be sealed such that air contained in the spacer mesh is directed out through the unsealed face toward the passenger.

Ventilation may be incorporated into one or more of the backrest cushion assembly 22 and the seat bottom cushion assembly 24, among other seat elements. A source of pressurized air 48, such as an air compressor or vehicle air system (e.g., vehicle HVAC system), supplies pressurized air to an air inlet 50 of a vortex tube 52 or like rotor-less turbo expander tube. Pressurized air entering the vortex tube 52 and accelerated along the length of the tube separates into a hot air stream (i.e., air temperature above ambient air temperature) exhausted out a first end of the tube through a hot air outlet 54, and a cold air stream (i.e., air temperature below ambient air temperature) exhausted out a second end of the tube through a cold air outlet 56. The hot air outlet 54 is coupled via a first duct 58 to a hot air inlet 60 of a manifold assembly 62 or the like, and the cold air outlet 56 is coupled via a second duct 64 to a cold air inlet 66 of the same manifold assembly. The manifold assembly 62 operates to control the passage and mixing of hot and cold air flow therethrough and can include butterfly valves or the like for mixing hot and cold air together or with ambient air to produce conditioned air, which flows out through a duct or network of ducts 68 for dispersal through the spacer mesh. The manifold assembly 62 may include multiple conditioned air outlets 70, with each outlet coupled in fluid communication to a duct having a portion of its length embedded in the cushion assembly and a dispersing portion positioned in the spacer mesh. A plurality of openings may be provided along the length of each duct for reducing air pressure of the dispersed conditioned air.

The manifold assembly 62 may further include an air return or exhaust 72 coupled in fluid communication to the source of the pressurized air, the vehicle HVAC system, the cabin environment, or elsewhere. The source of pressurized air may 48 be an air compressor dedicated to the seat conditioning system(s). Each seat may be equipped with its own air compressor or multiple seats may draw air from a central compressor. Compressor performance is determinative of the achievable temperature range, with a direct relationship between temperature and pressure. For example, about 5 psi may produce a temperature range from about 62° F. to about 97° F., while about 20 psi may produce a temperature range from about 50° F. to about 150° F. Alternative sources of pressurized air can include, but are not limited to, a pump, aircraft air supply, etc.

In the case of individual compressors, the compressor may be located with the seat assembly, such as below the seat pan 28 or backrest structural element 26. The manifold assembly 62 may be attached directly to the air compressor 48 or may be removed therefrom and coupled in fluid communication thereto with an air conduit, such as an air hose or the like, so that the manifold assembly and the air compressor can be located in two different locations with respect to the seat assembly because of packaging constraints. An electric motor of the air compressor is activated to generate a supply of pressurized air. The air compressor can include a pressure regulator and pressure gauges to control the amount of pressure provided to the manifold assembly. The air compressor may or may not include a small volume air storage tank providing a reservoir for storing air under pressure for immediate seat ventilation performance on demand. In a system including an air storage tank, the air compressor may regularly cycle on and off to replenish the supply of air in the tank when the tank reaches a predetermined low-pressure point. In a system without an air storage tank, the air compressor may activate with a control command to supply air and deactivate with a control command to discontinue supplying air.

The manifold assembly 62 can include a safety pressure release valve for releasing pressure from within the manifold assembly. The manifold assembly 62 generally operates to control and distribute heated or cooled conditioned air to the conduit network(s) 68. The manifold assembly 62 generally includes the hot and cold air inlets 60,66 coupled in fluid communication with the hot and cold air outlets 54, 56 of the vortex tube 52. Additional outlet ports may be provided on the manifold assembly to provide conditioned air to a second seat or allow for future expansion of the system. A pressure regulator assembly may be incorporated into the manifold assembly including one or more valves opened or closed by actuating the controller to regulate the pressure of the flowing air at the one or more outlet ports. For example, it may be desirable to provide the same or different air flow rates through the backrest and seat bottom. It may also be necessary to provide more air flow to ducts having a long length or bends.

The network of ducts 68 generally includes one or more lengths of air duct, such as air tubing, extending between an outlet port on the manifold assembly 62 and a portion of the cushion assembly. Each length of air conduit may be a direct run or may be split to disperse air different portions of the cushion assembly. The air conduits may be routed through the respective cushion assembly, between the cushion assembly and its respective supporting element, of within passages defined along a face of the supporting element.

Figure 4:
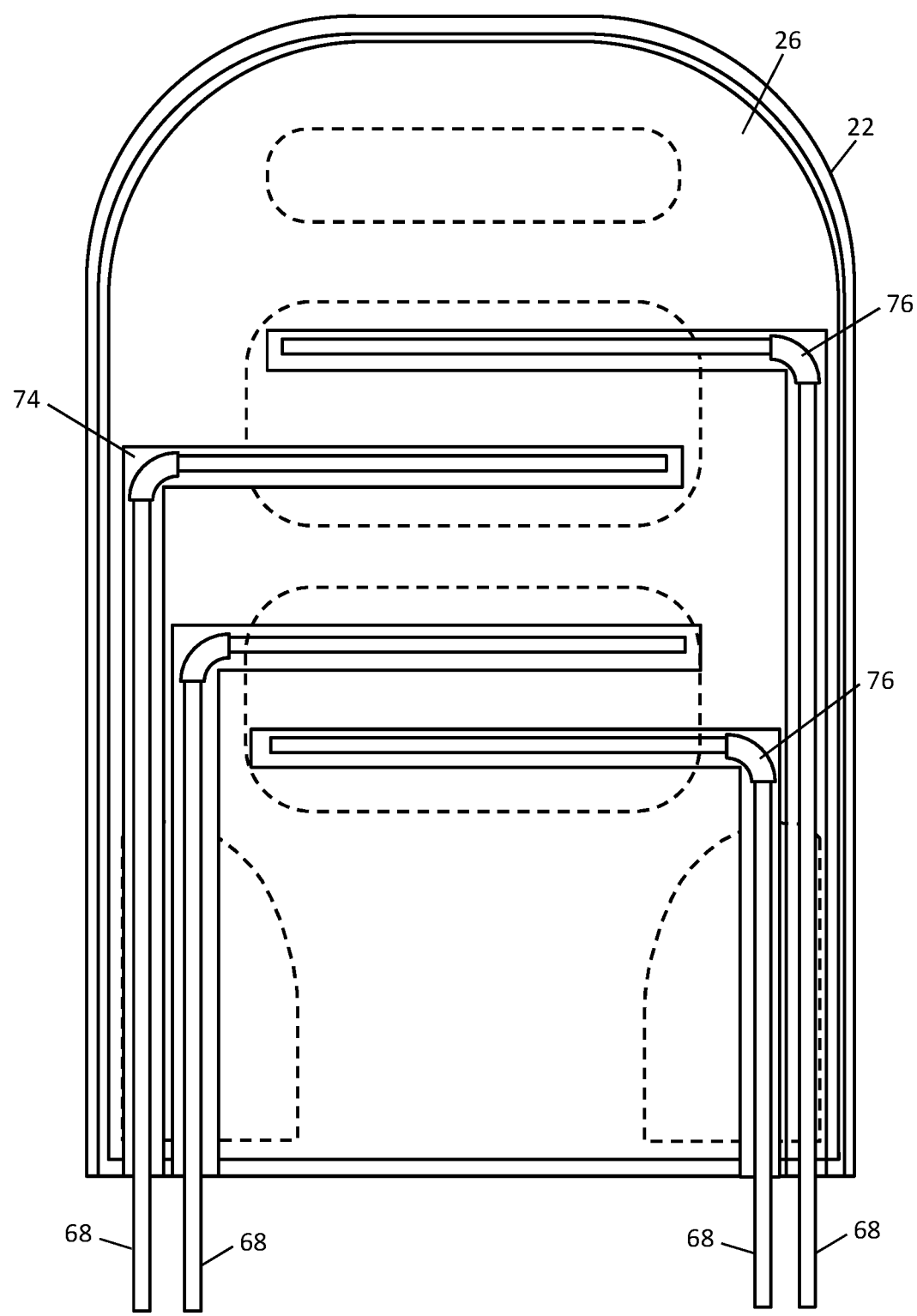
FIG. 4 illustrates a partially deconstructed backrest assembly according to the present disclosure.

FIG. 4 depicts a specific seat construction in which passages 74 are formed in a frontside of the structural frame element 26 and are recessed from a front planar face of the element. Each passage 74 can have a depth corresponding to substantially a thickness of a duct 68, such as an air conduit, routed therethrough. In some embodiments, the passages 74 are shaped and directed from an air conduit entry point of the element to a target region in one of the aforementioned target regions, among others. As illustrated, the air conduits can be constructed from rigid tubing section joined together with connectors 76 for providing directional changes. Each air conduit can be open at its distal end, and elsewhere, within the target region to disperse air flow throughout the respective target region.

Referring again to FIG. 1, a controller 78 operates the manifold assembly 62, manually or by electronic control, and is some embodiments also activates the pressurized air supply 48. The controller 78 may be operatively coupled to or an integral part of a passenger seat control interface. The control interface may be located on the seat assembly or in proximity thereto. The control interface may be collocated with the seat control features such that all seat comfort controls are provided in the same passenger device. Ventilation system controls may include, but are not limited to, one or more of activating air flow, adjusting output, selecting a target region(s) to be conditioned, temperature control, etc. Each passenger control interface may be networked with a master crew controller capable of overriding each individual seat controller. For example, all ventilation systems may be deactivated during taxi, takeoff and landing and permitted to be selectively activated during flight.

In some embodiments the system includes at least one sensor positioned in the seat assembly communicatively coupled to the controller 78. The sensor may be a temperature sensor, air flow sensor, or both. The sensor may send signals to the controller regarding a sensed condition to provide automatic conditioning in response to exceeding a predetermined threshold value, such as a predetermined threshold temperature. Each sensor may be a device or a subsystem capable of detecting condition changes within the seat assembly and with a processor within or in communication with the controller. The system sensors relay information to the processor where processing logic analyzes the data received to control the system. The processor may be a component of a server, such as a digital computer also including input/output (I/O) interfaces, a network interface, a data store, and memory. The components may be communicatively coupled via a local interface such as one or more buses or other wired or wireless connections. The local interface may have additional elements such as controllers, buffers (caches), drivers, repeaters, and receivers, among others, to enable communications. Further, the local interface may include address, control, and/or data connections to enable appropriate communications among the components.

The processor is a hardware device for executing software instructions such as collation algorithms. The processor may be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the processor is configured to execute software stored within the memory, to communicate data to and from the memory, and to generally control operations of the server pursuant to the software instructions. The I/O interfaces may be used to receive user input from and/or for providing system output to one or more devices or components such as the described or inferred sensors, an aircraft network, and flight crew devices. I/O interfaces may include a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

A network interface may be used to enable the server to communicate on a network, such as the Internet, a wide region network (WAN), a local region network (LAN) such as the secure aircraft network, and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described or inferred herein.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A seat heating and cooling system, comprising:
   a source of pressurized air;
   a vortex tube having an air inlet coupled to the source of pressurized air, a hot air outlet disposed at a first end of the vortex tube, and a cold air outlet disposed at a second end of the vortex tube;
   a manifold assembly having a hot air inlet coupled to the hot air outlet, a cold air inlet coupled to the cold air outlet, and an air return coupled to the source of pressurized air or a vehicle HVAC system;
   a network of ducts coupled to the manifold assembly and embedded in a cushion assembly for dispersing conditioned air into the cushion assembly; and
   a controller for controlling passage of hot and cold air flow through the manifold assembly.

2. The system of claim 1, wherein the cushion assembly comprises embedded spacer mesh and a perforated dress cover, and wherein the network of ducts includes ducts positioned to disperse conditioned air into an interior of the spacer mesh to be dispersed through the perforated dress cover.

3. The system of claim 2, wherein the cushion assembly is disposed in a backrest, the spacer mesh is disposed in an upper portion and a lower portion of the backrest, and the network of ducts includes at least one duct extending between the manifold assembly and the upper portion of the backrest and at least one duct extending between the manifold assembly and the lower portion of the backrest.

4. The system of claim 2, wherein the cushion assembly is disposed in a seat bottom, the spacer mesh is disposed in an upper portion of the seat bottom, and the duct network includes at least one duct extending between the manifold assembly and the upper portion of the seat bottom.

5. The system of claim 2, further comprising a first cushion assembly disposed in a backrest having spacer mesh disposed in an upper portion and a lower portion of the backrest, and a second cushion assembly disposed in a seat bottom having spacer mesh disposed in an upper portion of the seat bottom, and wherein the duct network includes at least one duct extending between the manifold assembly and the upper portion of the backrest, at least one duct extending between the manifold assembly and the lower portion of the backrest, and at least one duct extending between the manifold assembly and the upper portion of the seat bottom.

6. The system of claim 1, wherein the manifold assembly operates to provide one of hot air flow and cold air flow to the network of ducts while returning the other of hot air flow and cold air flow to the source of pressurized air or a vehicle HVAC system.

7. The system of claim 1, wherein the manifold assembly operates to mix hot and cold air flows supplied from the vortex tube.

8. The system of claim 1, wherein the source of pressurized air is a dedicated air compressor or a vehicle HVAC system.

9. The system of claim 1, wherein the controller is disposed in a seat element or proximate a seat.

10. The system of claim 1, wherein the vortex tube comprises an elongate acceleration chamber in fluid communication with the air inlet, the hot air outlet, and the cold air outlet, and wherein pressurized air enters through the air inlet tangentially to one side of the tube and into the acceleration chamber.

11. A passenger seat, comprising:
a frame;
a cushion assembly supported on the frame and including spacer mesh;
a vortex tube having an air inlet adapted to be coupled to a source of pressurized air, a hot air outlet disposed at a first end of the vortex tube, and a cold air outlet disposed at a second end of the vortex tube;
a manifold assembly having a hot air inlet coupled to the hot air outlet, a cold air inlet coupled to the cold air outlet, and an air return adapted to be coupled to the source of pressurized air or to a vehicle HVAC system;
a network of ducts coupled to the manifold assembly and embedded in the seat cushion assembly for dispersing conditioned air into the spacer mesh; and
a controller for controlling passage of hot and cold air through the manifold assembly, the controller disposed within a seat element or proximate the passenger seat.

12. The seat of claim 11, wherein the cushion assembly further comprises a perforated dress cover, and wherein the network of ducts includes ducts positioned to disperse conditioned air into an interior of the spacer mesh to be dispersed through the perforated dress cover.

13. The seat of claim 12, wherein the cushion assembly is disposed in a backrest, the spacer mesh is disposed in an upper portion and a lower portion of the backrest, and the network of ducts includes at least one duct extending between the manifold assembly and the upper portion of the backrest and at least one duct extending between the manifold assembly and the lower portion of the backrest.

14. The seat of claim 12, wherein the cushion assembly is disposed in a seat bottom, the spacer mesh is disposed in an upper portion of the seat bottom, and the duct network includes at least one duct extending between the manifold assembly and the upper portion of the seat bottom.

15. The seat of claim 12, further comprising a first cushion assembly disposed in a backrest having spacer mesh disposed in an upper portion and a lower portion of the backrest, and a second cushion assembly disposed in a seat bottom having spacer mesh disposed in an upper portion of the seat bottom, and wherein the duct network includes at least one duct extending between the manifold assembly and the upper portion of the backrest, at least one duct extending between the manifold assembly and the lower portion of the backrest, and at least one duct extending between the manifold assembly and the upper portion of the seat bottom.

16. The seat of claim 11, wherein the manifold assembly operates to provide one of hot airflow and cold air flow to the network of ducts while returning the other of hot air flow and cold air flow to the source of pressurized air or a vehicle HVAC system.

17. The seat of claim 11, wherein the manifold assembly operates to mix hot and cold air flows supplied from the vortex tube.

18. An economy class aircraft passenger seat assembly, comprising:
a cushion assembly including a spacer mesh component;
a vortex tube having an air inlet adapted to be coupled to a source of pressurized air, a hot air outlet disposed at a first end of the vortex tube, and a cold air outlet disposed at a second end of the vortex tube;
a manifold assembly having a hot air inlet coupled to the hot air outlet, a cold air inlet coupled to the cold air outlet, and an air return adapted to be coupled to the source of pressurized air or a vehicle HVAC system;
a network of ducts coupled to the manifold assembly and embedded in the seat cushion assembly for dispersing conditioned air into the spacer mesh; and
a controller for controlling passage of hot and cold air through the manifold assembly, the controller operatively coupled to or an integral part of a passenger seat control interface for at least one of activating the controller, selecting between heated or cooled conditioned air, and selecting a conditioned air temperature.

19. The passenger seat assembly of claim 18, wherein the cushion assembly is disposed in a backrest, the spacer mesh is disposed in an upper portion and a lower portion of the backrest, and the network of ducts includes at least one duct extending between the manifold assembly and the upper portion of the backrest and at least one duct extending between the manifold assembly and the lower portion of the backrest.

20. The passenger seat assembly of claim 18, wherein the cushion assembly is disposed in a seat bottom, the spacer mesh is disposed in an upper portion of the seat bottom, and the duct network includes at least one duct extending between the manifold assembly and the upper portion of the seat bottom.

* * * * *